US009378364B1

(12) United States Patent
Weast et al.

(10) Patent No.: US 9,378,364 B1
(45) Date of Patent: Jun. 28, 2016

(54) TECHNOLOGIES FOR MANAGING SECURITY THREATS TO A COMPUTING SYSTEM UTILIZING USER INTERACTIONS

(71) Applicants: John C. Weast, Portland, OR (US); Brian D. Johnson, Portland, OR (US); Tobias M. Kohlenberg, Portland, OR (US)

(72) Inventors: John C. Weast, Portland, OR (US); Brian D. Johnson, Portland, OR (US); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,692

(22) Filed: Dec. 27, 2014

(51) Int. Cl.
*G06F 21/55* (2013.01)
*G06F 21/56* (2013.01)
*G06F 21/57* (2013.01)
*H04L 29/06* (2006.01)

(52) U.S. Cl.
CPC ............. *G06F 21/55* (2013.01); *G06F 21/56* (2013.01); *G06F 21/577* (2013.01); *H04L 63/1441* (2013.01); *G06F 2221/034* (2013.01); *H04L 63/20* (2013.01)

(58) Field of Classification Search
CPC ........ H04L 63/20; G06F 21/55; G06F 21/577
USPC ......................................................... 726/25
See application file for complete search history.

(56) References Cited

U.S. PATENT DOCUMENTS

| 7,461,036 | B2 * | 12/2008 | Genty | ...................... G06N 3/02 706/15 |
| 9,043,905 | B1 * | 5/2015 | Allen | ................... H04L 63/1441 726/22 |
| 2004/0107362 | A1 * | 6/2004 | Ravishankar | ......... H04L 63/102 726/1 |
| 2004/0260941 | A1 * | 12/2004 | Fearnley | ................. H04L 63/08 726/29 |
| 2005/0050351 | A1 * | 3/2005 | Cain | ................... H04L 63/1433 726/4 |
| 2006/0229896 | A1 * | 10/2006 | Rosen | ................ G06Q 10/1053 705/321 |
| 2012/0319724 | A1 * | 12/2012 | Plusquellic | ........... H04L 9/0861 326/8 |

* cited by examiner

*Primary Examiner* — Dao Ho
(74) *Attorney, Agent, or Firm* — Barnes & Thornburg LLP (57) ABSTRACT

Technologies for managing security threats on a computing system include detecting a security threat to the computing system, determining a plurality of mitigation scenarios to employ on the computing system to mitigate the security threat, and implementing the plurality of mitigation scenarios. Each mitigation scenario includes one or more threat mitigation actions to be taken by the computing system, one or more response systems of the computing system to perform the threat mitigation actions, and a temporal sequence in which the threat mitigation actions are to be taken. The results of each mitigation scenario is evaluated and a validated mitigation scenario is determined based on the results. A user of the computing device may be subsequently trained or habituated to mitigate the security threat by requesting interaction from the user during the implementation of the validated mitigation scenario in response to a threat scenario designed to replicate the security threat.

18 Claims, 5 Drawing Sheets

TECHNOLOGIES FOR MANAGING SECURITY THREATS TO A COMPUTING SYSTEM UTILIZING USER INTERACTIONS

BACKGROUND

Traditional security software and technologies for computing systems generally attempt to keep the system completely secured by avoiding or reducing any potential threats before they infect the computing system. As computing systems become very more interconnected with other computing devices and even more devices become "smart" and enabled for communications, the realistic probability of keeping a computing system completely free of all threats decreases. Regardless, typical security systems operate on the paradigm that such an ability or state can always be achieved. While drastic measures can be taken to ensure, or nearly ensure, the security of a computing system (e.g., removing the computing system from communication networks), such measures overly limit the use of the computing system and reduce its value to the user.

Additionally, many typical security software and technologies attempt to combat potential threats or remediate active threats without interaction of the user. That is, typical security technologies attempt to secure the computing system automatically so as not to bother the user. While such a security paradigm can be useful to the user, the user may not be taught the good security habits and responses employable by a user to further mitigate security threats.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
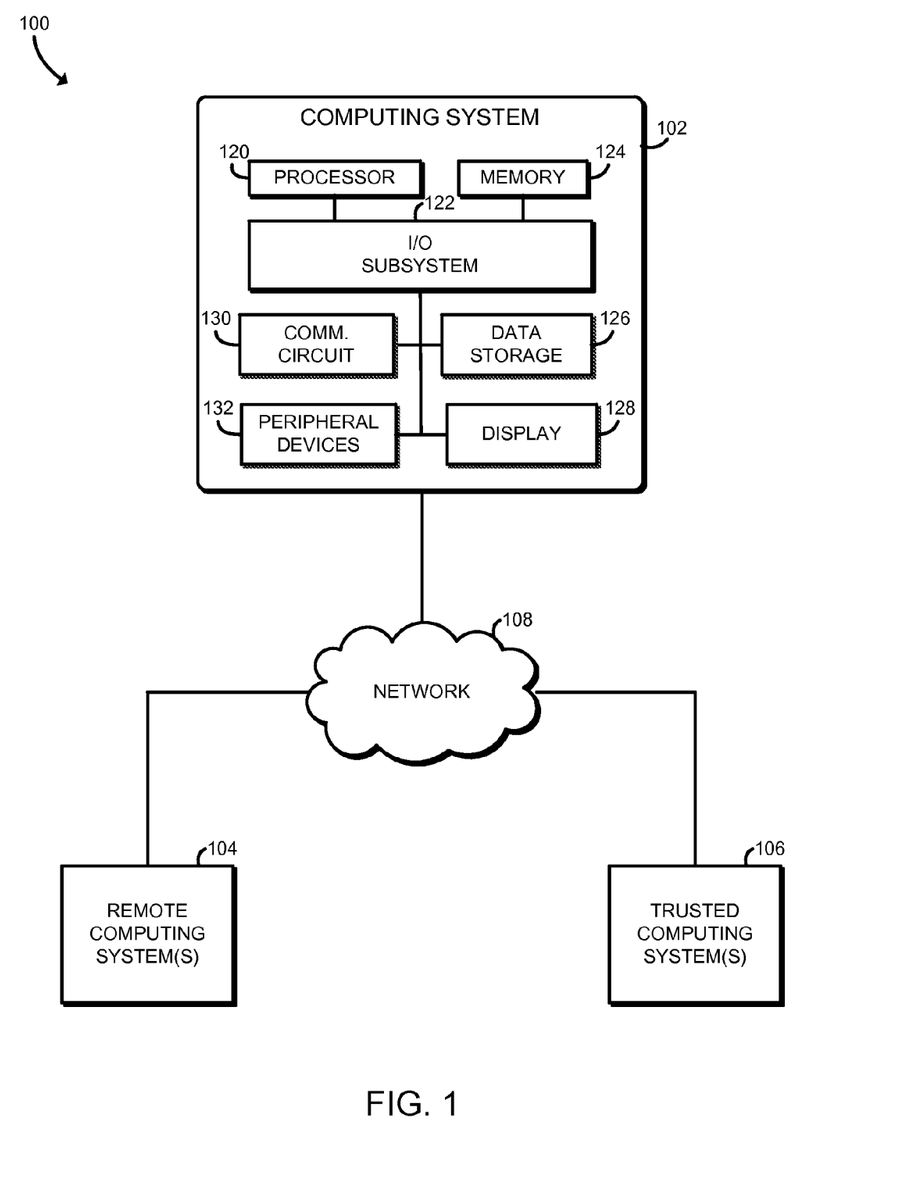
FIG. 1 is a simplified block diagram of at least one embodiment of a system for managing threats to a computing system utilizing user interactions.

Referring now to FIG. 1, a system 100 for managing security threats to a computing system utilizing user interactions includes a computing system 102, which may communicate with one or more remote computing systems 104 and/or trusted computing systems 106 over a network 108. In use, as discussed in more detail below, the computing system 102 is configured to monitor for security threats occurring on the computing system 102 and generate multiple mitigation and/or detection scenarios to respond to a single detected security threat. Each mitigation scenario may include different mitigation actions performed by different threat response systems of the computing system 102 at various time scales. As discussed in more detail below, by implementing multiple mitigation scenarios for a single threat, the computing system 102 is able to monitor the effectiveness and/or results of each mitigation scenario over the varying time scales to determine a "best case" mitigation scenario, which is validated and save for later use against a repeated security threat of the same type. It should be appreciated that unlike typical security approaches that try to avoid infection of a computing system, the computing system 102 assumes the security threat has already infected the computing system 102, and may let it do so in some embodiments. In this way, the computing system 102 focuses on mitigation actions to correct or mitigate the threat or actions caused by a security threat (e.g., malware), using the assumption that no computer system is ever completely safe from attack.

In addition to determining the best mitigation scenario to respond to a given security threat, the computing system 102 also habituates or trains the user of the computing system 102 in mitigation techniques. To do so, the computing system 102 may implement threat scenarios, which may be replicated or actual threats, and implements the previously validated mitigation scenarios to respond to the security threat. In do so, the computing system 102 requests threat mitigation user interactions from the user to help mitigate the security threat. In some embodiments, the computing system 102 may reward the user for proper threat mitigation user interactions to better train or habituate the user to good security habits. In this way, the computing system 102 trains the user in how to respond to security threats, again under the assumption that security threats will occur.

The computing system 102 may be embodied as any type of computer system capable of responding to security threats using multiple mitigation scenarios and performing the other functions described herein. For example, the computing system 102 may be embodied as a server, a computer, a multi-processor system, a processor-based system, a desktop computer, a tablet computer, a notebook computer, a laptop computer, or any other computing device capable of generating a threat assessment as described herein. Although the computing system 102 is illustratively shown in FIG. 1 as single computing device, it should be appreciated that the computing system 102 may be embodied as a distributed computing system, a virtual computing system, a cloud service, a collection of computers or computing systems, or otherwise have a distributed architecture.

As shown in FIG. 1, the computing system 102 includes a processor 120, an I/O subsystem 122, a memory 124, a data storage 126, a display 128, and a communication circuit 130. Of course, the computing system 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments The processor 120 may be embodied as any type of processor capable of performing the functions described herein. For example, the processor 120 may be embodied as a single or multi-core processor(s), a single or multi-socket processor, a digital signal processor, a microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing system 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing system 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing system 102, on a single integrated circuit chip.

The data storage 126 may be embodied as any type of device or devices configured for the short-term or long-term storage of data. For example, the data storage 126 may include any one or more memory devices and circuits, memory cards, hard disk drives, solid-state drives, or other data storage devices. In some embodiments, as discussed below, the data storage 126 may store various databases including a threat mitigation actions database 250, a threat response systems database 252, and a validated mitigation scenario database 254 (see FIG. 2).

The display 128 may be embodied as any type of display capable of displaying images, data, and/or other information to a user including, but not limited to, a liquid crystal display (LCD), a light emitting diode (LED), a plasma display, a cathode ray tube (CRT), or other type of display device. In some embodiments, the display 128 may include a touchscreen to facilitate user interaction.

The communication circuit 130 may be embodied as any type of communication circuit, device, or collection thereof, capable of enabling communications between the computing system 102 and the remote computing systems 104 and the trusted computing systems 106. To do so, the communication circuit 130 may be configured to use any one or more communication technology and associated protocols (e.g., Ethernet, Bluetooth®, Wi-Fi®, WiMAX, etc.) to effect such communication.

In some embodiments, the computing system 102 may further include one or more peripheral devices 132. Such peripheral devices 132 may include any type of peripheral device commonly found in a server or computer device, for example, a hardware keyboard, input/output devices, peripheral communication devices, and/or other peripheral devices.

Each of the remote computing system 104 may be embodied as any type of computer or computer system with which the computing system 102 may periodically communicate. In the illustrative embodiment, one or more of the remote computing systems 104 are untrustworthy and transmit security threats to the computing system 102 during interactions. For example, an infected remote computing system 104 may infect the computing system 102 with malware, which the computing system 102 treats as a security threat and implements the multiple mitigation scenarios discussed below.

The trusted computing system(s) 106 may also be embodied as any type of computer or computer system capable of communicating with the computing system 102 over the network 108. As discussed in more detail below, the computing system 102 may utilize one or more of the trusted computing systems 106 as a threat response system as part of a mitigation scenario to deal with a security threat occurring on the computing system 102. As such, the trusted computing system(s) 106 may be configured to respond to security threats directly, provide assistance to the computing system 102 in responding to a security threat (e.g., performing malware analysis), and/or otherwise participate in mitigation scenarios to mitigate a security threat occurring on the computing system 102.

Figure 2:
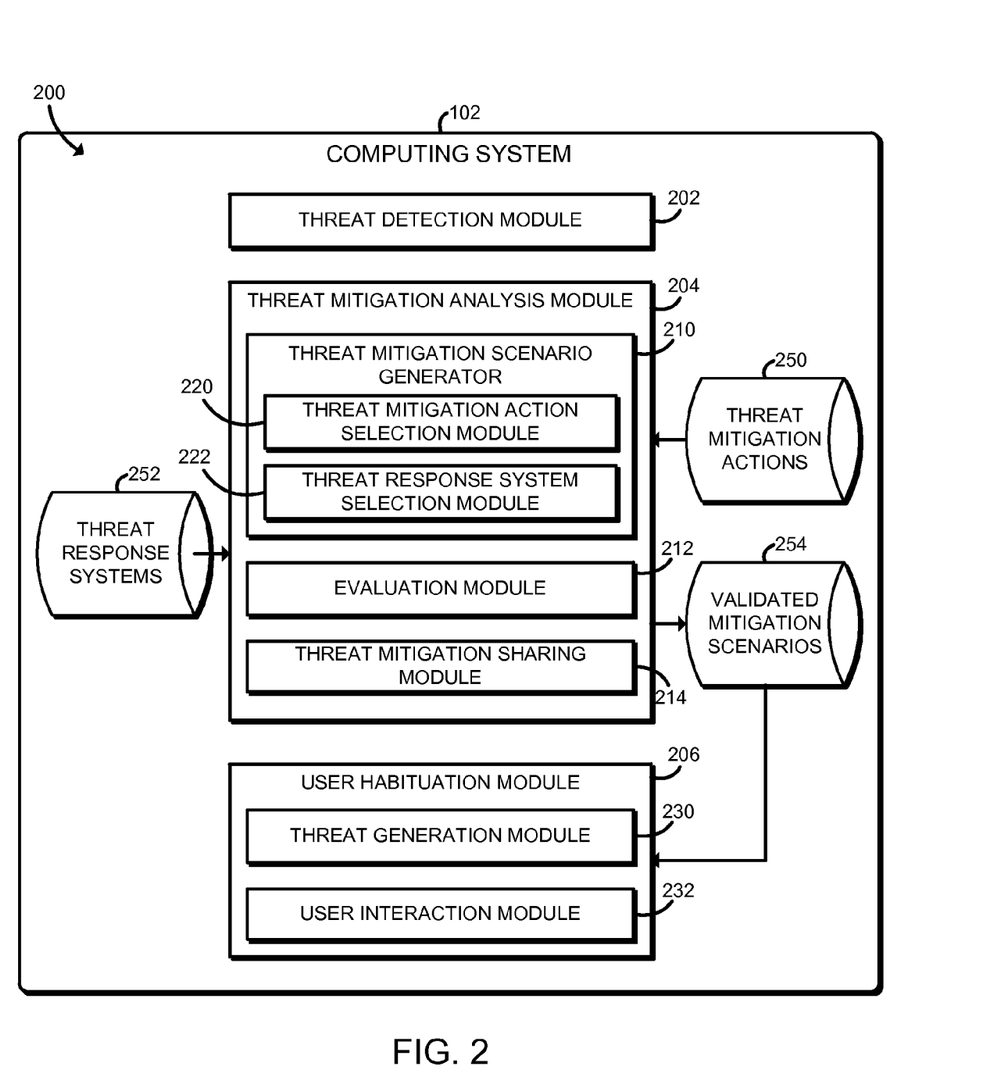
FIG. 2 is a simplified block diagram of at least one embodiment of an environment that may be established by a computing system of the system of FIG. 1.

Referring now to FIG. 2, in use, the computing system 102 may establish an environment 200. The illustrative environment 200 includes a threat detection module 202, a threat mitigation analysis module 204, and a user habituation module 206. Each of the modules and other components of the environment 200 may be embodied as firmware, software, hardware, or a combination thereof. For example the various modules, logic, and other components of the environment 200 may form a portion of, or otherwise be established by, the processor 120, the I/O subsystem 122, an SoC, or other hardware components of the computing system 102. As such, in some embodiments, any one or more of the modules of the environment 200 may be embodied as a circuit or collection of electrical devices (e.g., threat detection circuit, a threat mitigation analysis circuit, and a user habituation circuit, etc.).

The threat detection module 202 is configured to detect the presence of a security threat on the computing system 102. To do so, the threat detection module 202 may utilize any suitable algorithm or methodology for detecting a security threat including, for example, virus signatures, behavioral analysis, and/or other methodologies.

The threat mitigation analysis module 204 is configured to construct multiple threat mitigation scenarios on the computing system 102 to combat the security threat, implement the mitigation scenarios, and evaluate the results of the individual mitigation scenarios. To do so, the threat mitigation analysis module 204 includes a threat mitigation scenario generator 210. As discussed above, each mitigation scenario includes one or more mitigation actions performed by one or more response systems at various time scales. Depending on the implementation and processing power of the computing system 102, the threat mitigation scenario generator 210 may be configured to generate a few to a vast array of mitigation scenarios. For example, in the illustrative embodiment wherein the computing system 102 is embodied as an emergent computing system having massive-scale processing power, which may be distributed, and generates thousands or millions of threat mitigation scenarios to respond to a given security threat.

As shown in FIG. 2, the threat mitigation scenario generator 210 includes a threat mitigation action selection module 220. The threat mitigation action selection module 220 selects one or more mitigation action for each mitigation scenario. Illustratively, the set of mitigation actions for each mitigation scenario is unique among the mitigation scenarios. Each mitigation action may be embodied as any type of action that may be performed by a threat response system, which may be located on the computing system 102 or remote therefrom (e.g., the trusted computing system 106). For example, the mitigation actions may be embodied as traditional security functions such as backing up data, reinstalling applications, rebooting, restoring to a safe point, data journaling, social sharing of security threat, public shaming of security threat, perfect forward secrecy, and/or other security or threat mitigation functions (or combination thereof. Additionally, each mitigation function may be embodied as a single action or as multiple actions, which may be performed over a given time, performed periodically, performed repeatedly, and so forth.

In some embodiments, the available mitigation actions may be pre-defined and stored in the threat mitigation actions database 250. In such embodiments, the threat mitigation action selection module 220 may select the threat mitigation actions for each mitigation scenario from the threat mitigation actions database 250. For example, the threat mitigation action selection module 220 may randomly select and assign the mitigation actions or select the mitigation actions according to some criteria or selection algorithm.

The threat mitigation scenario generator 210 also includes a threat response system selection module 222. The threat response system selection module 222 selects one or more threat response systems for each mitigation scenario. Again, the set of threat response systems for each mitigation scenario is unique among the mitigation scenarios in the illustrative embodiment. Each threat response system may be embodied as any hardware, software, firmware, or combination thereof system usable by the computing system 102 to respond to and/or mitigate the security threat. Additionally, the threat response systems may be from any architectural level of the computing system 102 and may or may not be dedicated to security functionality. For example, one threat response system may be embodied as an application usable by the computing system 102 to perform some type of threat mitigation action, while another threat response system may be embodied as a kernel process usable to perform some type of threat mitigation action, and yet another threat response system may be embodied as a hardware component capable of performing some type of threat mitigation action.

In some embodiments, the available threat response systems may be pre-defined and stored in the threat response systems database 252. In such embodiments, the threat response system selection module 222 may select the threat response systems for each mitigation scenario from the threat response systems database 252. For example, the threat response system selection module 222 may randomly select and assign the threat response systems or select the threat response systems according to some criteria or selection algorithm.

As discussed in more detail below, the threat mitigation scenario generator 210 implements the generated mitigation scenarios. In doing so, each mitigation action of each mitigation scenario may be performed in varying time scales as discussed below in regard to FIG. 4. As discussed above, the computing system 102 monitors the effectiveness of the various mitigation scenarios in mitigating the security threat. To do so, the threat mitigation analysis module 204 includes an evaluation module 212 configured to evaluate each mitigation scenario in its individual effectiveness in responding to the security threat. The evaluation module 212 may use any suitable measuring criteria (e.g., speed of resolution, amount of data loss, thoroughness of threat removal, etc.). The evaluation module 212 is configured to select one of the mitigation scenarios as the best or preferred mitigation scenario as the validated mitigation scenario for responding to the particular security threat. The evaluation module 212 subsequently stores the validated mitigation scenario in the validated mitigation scenario database 254.

In some embodiments, the threat mitigation analysis module 204 may also include a threat mitigation sharing module 214. The threat mitigation sharing module 214 is configured to share validated mitigation scenarios with other trusted computing systems 106, which may utilize the mitigation scenarios for responding to security threats.

As discussed above, the computing system 102 is also configured to train or habituate the user in good security habits and/or response actions consistent with the validated migration scenarios. To do so, the computing system 102 may implement a threat scenario, which may replicate a security threat or introduce a real security threat to the computing system. To do so, the user habituation module 206 includes a threat generation module 230 configure to generate a security threat based on an available validated mitigation scenario stored in the validated mitigation scenario database 254. That is, the threat generation module 230 selects security threat that has previously been successfully resolved. As discussed above, the threat generation module 230 may implement the security threat as a replicated drill or may reintroduce the actual security threat to the computing system 102 (e.g., reintroduce malware to the system).

The user habituation module also includes a user interaction module 232, which is configured to prompt the user for interaction during the execution of the mitigation scenario used to respond to the generated security threat. The user interaction module 232 may prompt the user in any way (e.g., via suggestions, requests, commands, etc.). The requested user interactions may be embodied as any type of user actions capable of mitigating, or helping the mitigation of, the security threat. In some embodiments, the user interaction module 232 is also configured to reward the user for successful interaction. In this way, the user interaction module 232 may create a game-like environment in which to train the user in helpful mitigation tasks.

Figure 3:
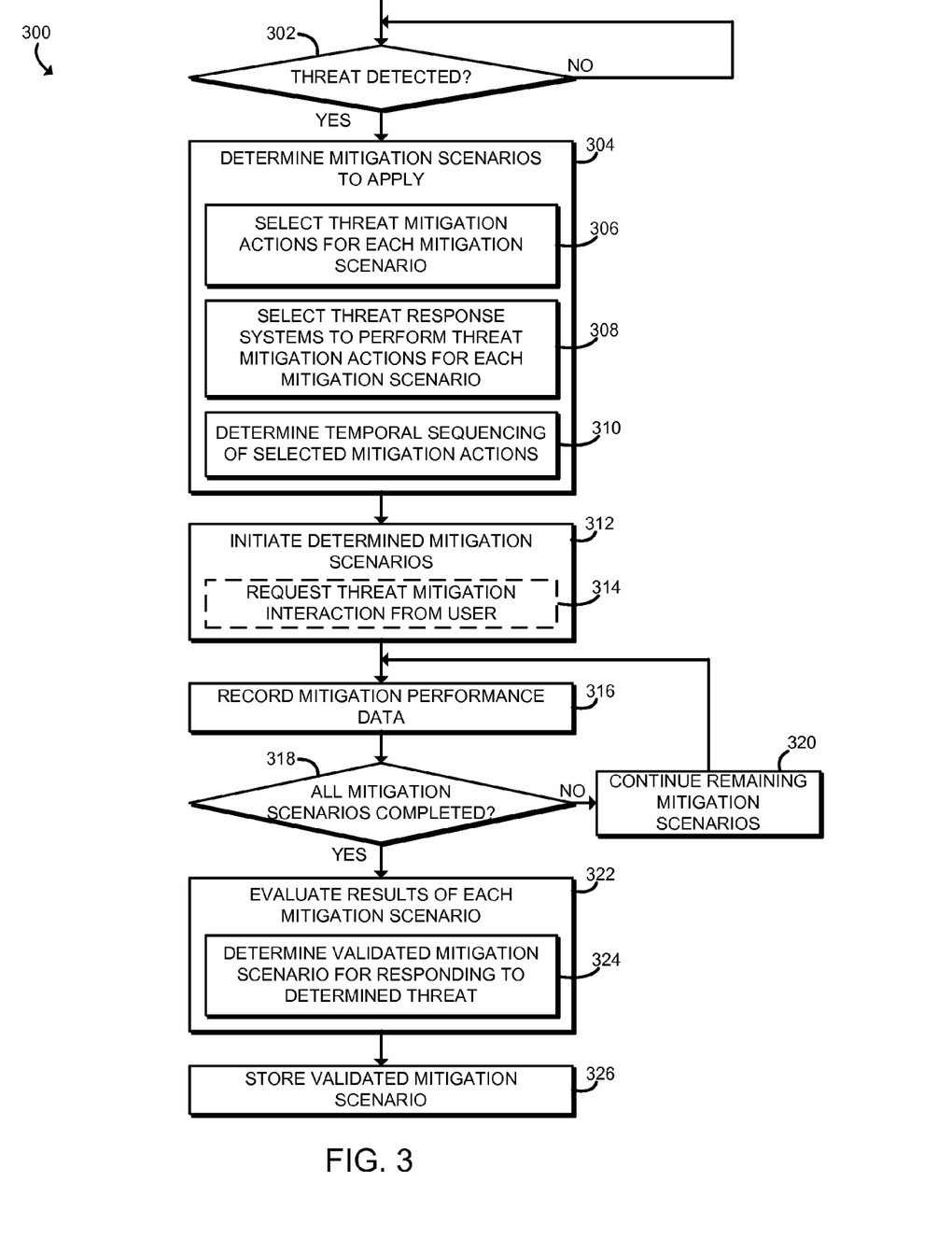
FIG. 3 is a simplified flow diagram of at least one embodiment of a method for managing threats that may be executed by the computing system of FIGS. 1 and 2.

Referring now to FIG. 3, in use, the computing system 102 may execute a method 300 for managing security threats. The method 300 begins with block 302 in which the computing system 102 monitors for the presence of a security threat. As discussed above, the computing system 102 may utilize any suitable methodology to monitor for security threats (e.g., virus signatures, behavioral analysis, etc.). If a security threat is detected in block 302, the method 300 advances to block 304 in which the computing system 102 determines the mitigation scenarios to be applied in response to the security threat. As discussed above, the computing system 102 may implement any number of mitigation scenarios based on the processing power of the computing system 102 and/or other criteria. Additionally, each mitigation scenario includes multiple mitigation actions performed by different threat response systems at different times. As such, in block 306, the computing system 102 selects one or more threat mitigation action for each mitigation scenario. Additionally, in block 308, the computing system 102 selects a threat response system to perform each mitigation action for each mitigation scenario. As discussed above, the threat response systems may be from different architectural levels of the computing system 102 and/or be located remotely from the computing system 102.

Figure 4:
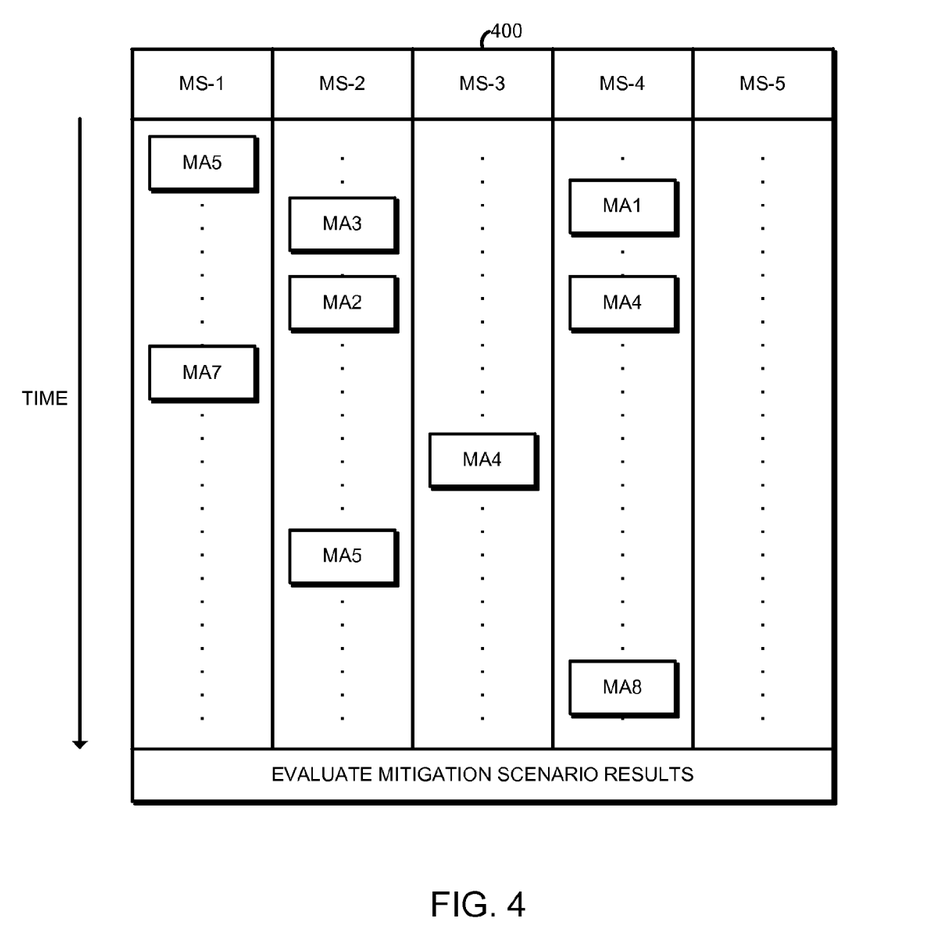
FIG. 4 is a simplified time diagram of various mitigation scenarios and associated mitigation actions that may be utilized by the computing system of FIGS. 1 and 2.

In block 310, the computing system 102 determines the temporal sequencing of the selected mitigation scenarios to establish different time scales for the various mitigation scenarios. For example, as shown in FIG. 4, an illustrative mitigation strategy 400 includes five different mitigation scenarios (MS1-MS5), with each having a different set of mitigation actions (MA1-MA8). Additionally, each mitigation action may be employed at different time scales relative to mitigation actions from other mitigation scenarios. For example, each mitigation action may have a different start time. In particular, the same mitigation action in two different mitigation scenarios may have different start times. It should be appreciated that the difference in time scales between the mitigation scenarios may or may not be represented as absolute time. For example, temporal adjustment may be achieved by adjusting clock speed on a computing, system, or component executing a particular mitigation scenario.

Referring back to FIG. 3, after the mitigation scenarios have been determined in block 304, the computing system 102 initiates the determined mitigation scenarios in block 312. During the execution of the mitigation scenarios, the computing system 102 may request threat mitigation interactions from the user, which may become part of a validated mitigation scenario.

Subsequently, in block 316, the computing system 102 records mitigation performance data for each mitigation scenario. The mitigation performance data may be embodied as any type of data indicative of the effectiveness of the corresponding mitigation scenario is mitigating the particular security threat. In block 318, the computing system 102 determines whether all mitigation scenarios have completed. If not, the method 300 advances to block 320 in which the computing system 102 continues the remaining mitigation scenarios and continues recording mitigation performance data in block 316.

However, if all mitigation scenarios have completed, the method 300 advances to block 322 in which the computing system 102 evaluates the results of each mitigation scenario. As discussed above, the computing system 102 may use any suitable criteria to evaluate the effectiveness of each mitigation scenario. In doing so, the computing system 102 selects one of the mitigation scenarios as the validated mitigation scenario for responding to that particular threat and stores the validated mitigation scenario in the validated mitigation scenario database 254.

Figure 5:
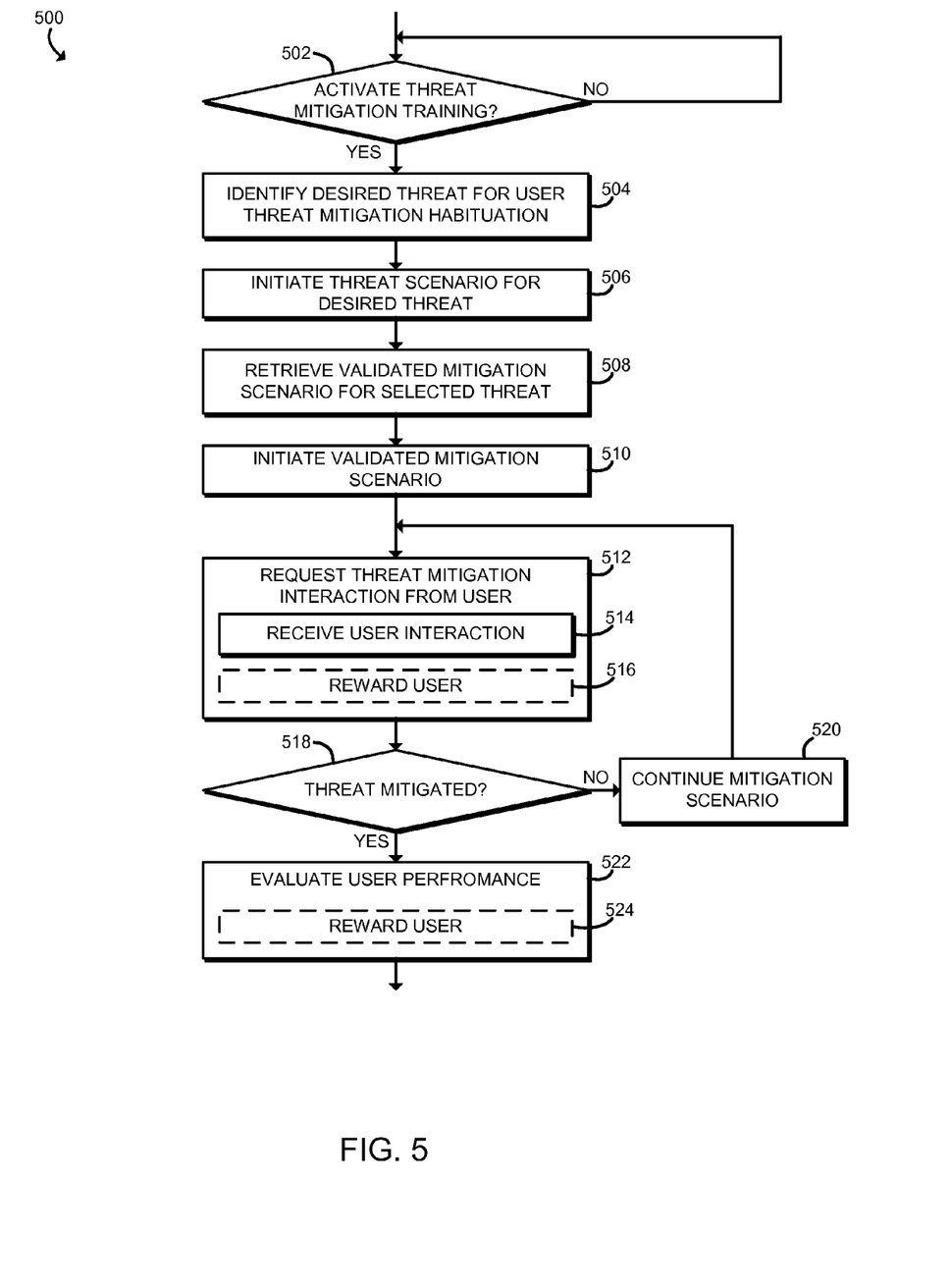
FIG. 5 is a simplified flow diagram of at least one embodiment of a method for habituating a user to perform various threat mitigation actions.

Referring now to FIG. 5, in use, the computing system 102 may also execute a method 500 for habituating a user to perform various threat mitigation actions. The method 500 begins with block 502 in which the computing system 102 determines whether to active threat mitigation training of the user. If so, the method 500 advances to block 504 in which the computing system 102 identifies a desired security threat for user threat mitigation habituation. As discussed above, the computing system 102 may select any security threat for which a validated mitigation scenario has previously been determined.

After a security threat has been selected, the method 500 advances to block 506 in which the computing system 102 initiates the security threat scenario. As discussed above, the security threat scenario may be a replicated scenario of the security threat or may be an actual infection of the security threat into the computing system 102. Regardless, in block 508, the computing system 102 retrieves the validated mitigation scenario for the selected security threat from the validated mitigation scenario database 254 and initiates the validated mitigation scenario in block 510.

During the execution of the validated mitigation scenario, the computing device requests threat mitigation interaction from the user in block 512. The computing system 102 may request such interaction randomly, periodically, or in response to actions of the mitigation scenario. For example, in some embodiments, the user may be requested to perform an action that the computing system 102 previously performed automatically as part of the mitigation scenario.

In block 514, the computing system 102 receives user interaction in response to the request. As discussed above, the computing system 102 may rewarded the user in block 516 for successful interaction. Subsequently, in block 518, the computing system 102 determines whether the threat has been mitigated. If not, the method 500 advances to block 420 in which the computing system 102 continues the mitigation scenario, including requesting user interaction in block 512. If, however, the threat has been mitigated, the method 500 advances to block 522 in which the computing system 102 evaluates the user's performance in responding to the requests for threat mitigation interactions and rewards the user accordingly in block 524. In this way, the computing system 102 trains or habituates the user into performing useful mitigation actions to mitigate a real-world security threat to the computing system 102. Over time, the user's habituated mitigation actions may improve the overall security of the computing system 102.

EXAMPLES

Illustrative examples of the devices, systems, and methods disclosed herein are provided below. An embodiment of the devices, systems, and methods may include any one or more, and any combination of, the examples described below.

Example 1 includes a computing system for managing security threats, the computing system comprising a threat detection module to detect the existence of a security threat to the computing system; a threat mitigation analysis module to determine a plurality of mitigation scenarios to employ to mitigate the security threat and implement each of the plurality of mitigation scenarios on the computing device to mitigate the security threat, wherein each mitigation scenario comprises (i) one or more threat mitigation actions to be performed by the computing system, (ii) one or more threat response systems of the computing system to be used to perform the selected threat mitigation actions, and (ii) a temporal sequence of the determined mitigation actions; and an evaluation module to evaluate a threat mitigation result of each mitigation scenario and select one of the mitigation scenarios from the plurality of mitigation scenarios to respond to future security threats based on the evaluation of the threat mitigation results.

Example 2 includes the subject matter of Example 1, and wherein the evaluation module is further to store the selected threat mitigation scenario as a validated threat mitigation scenario to use to respond to the security threat.

Example 3 includes the subject matter of any of Examples 1 and 2, and further including a user habituation module to implement a threat scenario on the computing system to replicate the security threat, wherein the threat mitigation analysis module is to receive the validated threat mitigation scenario and implement the validated threat mitigation scenario to mitigate the threat scenario, and wherein the user habituation module is further to request, from a user, at least one threat mitigation user interaction with the computing system to habituate the user in responding to the security threat.

Example 4 includes the subject matter of any of Examples 1-3, and wherein the user habituation module is further to reward the user based on the threat mitigation user interaction.

Example 5 includes the subject matter of any of Examples 1-4, and wherein the user habituation module is further to determine whether the threat scenario has been mitigated by the validated threat mitigation scenario; and evaluate a performance of the user in mitigating the threat scenario based on the threat mitigation user interaction.

Example 6 includes the subject matter of any of Examples 1-5, and wherein the one or more threat response systems comprise one or more systems of the computing system that is not dedicated to security of the computing system.

Example 7 includes the subject matter of any of Examples 1-6, and wherein the one or more threat response systems comprise a response system located remotely from the computing system.

Example 8 includes the subject matter of any of Examples 1-7, and wherein to determine one or more threat response systems comprises to determine multiple response systems, wherein each response system of the multiple response systems is from a different architecture level of the computing system.

Example 9 includes the subject matter of any of Examples 1-8, and wherein to determine one or more threat response systems comprises to determine a response system from a hardware level of the computing system and determining a response system from an application level of the computing system.

Example 10 includes the subject matter of any of Examples 1-9, and wherein to determine a temporal sequence of the determined mitigation actions comprises to determine, for each mitigation action of each mitigation scenario, a start time for the associated mitigation action.

Example 11 includes the subject matter of any of Examples 1-10, and wherein the start time for each mitigation action is different from the start time of each other mitigation action.

Example 12 includes the subject matter of any of Examples 1-11, and wherein to implement each of the plurality of mitigation scenarios comprises to implement each mitigation action of each mitigation scenario using the associated response system according to the associated temporal sequence.

Example 13 includes the subject matter of any of Examples 1-12, and wherein to implement each of the plurality of mitigation scenarios comprises to request a threat mitigation user interaction be performed by the user during implementation of at least one of the plurality of mitigation scenarios.

Example 14 includes the subject matter of any of Examples 1-13, and wherein to evaluate the threat mitigation result of each mitigation scenario comprises to determine an effectiveness of each mitigation scenario in mitigating an impact of the security threat to the computing system.

Example 15 includes the subject matter of any of Examples 1-14, and wherein to detect the existence of a security threat comprises to detect the presence of a malware on the computing system.

Example 16 includes the subject matter of any of Examples 1-15, and, wherein the one or more threat mitigation actions comprise a security action implementable by the computing system to respond to the detected security threat.

Example 17 includes the subject matter of any of Examples 1-16, and wherein the one or more threat mitigation actions comprise a data backup action, a data restore action, a data journaling action, a social sharing action, a public shaming action, or a perfect forward secrecy action.

Example 18 includes a method for managing security threats on a computing system, the method comprising detecting, by the computing system, the existence of a security threat to the computing system; determining, by the computing system, a plurality of mitigation scenarios to employ to mitigate the security threat, wherein determining the plurality of mitigation scenarios comprises determining, for each scenario, (i) one or more threat mitigation actions to be performed by the computing system, (ii) one or more threat response systems of the computing system to be used to perform the selected threat mitigation actions, and (ii) a temporal sequence of the determined mitigation actions; implementing, by the computing system, each of the plurality of mitigation scenarios to mitigate the security threat; evaluating, by the computing system, a threat mitigation result of each mitigation scenario; and selecting, by the computing system, one of the mitigation scenarios from the plurality of mitigation scenarios to respond to future security threats based on the evaluation of the threat mitigation results.

Example 19 includes the subject matter of Example 18, and further including storing, by the computing system, the selected threat mitigation scenario as a validated threat mitigation scenario to use to respond to the security threat.

Example 20 includes the subject matter of any of Examples 18 and 19, and further including implementing, by the computing system, a threat scenario on the computing system to replicate the security threat; retrieving the validated threat mitigation scenario; implementing the validated threat mitigation scenario to mitigate the threat scenario; and requesting, by the computing system and from a user, at least one threat mitigation user interaction with the computing system to habituate the user in responding to the security threat.

Example 21 includes the subject matter of any of Examples 18-20, and further including rewarding, by the computing system, the user based on the threat mitigation user interaction.

Example 22 includes the subject matter of any of Examples 18-21, and further including determining, by the computing system, whether the threat scenario has been mitigated by the validated threat mitigation scenario; and evaluating a performance of the user in mitigating the threat scenario based on the threat mitigation user interaction.

Example 23 includes the subject matter of any of Examples 18-22, and wherein determining one or more threat response systems comprises determining one or more systems of the computing system that is not dedicated to security of the computing system.

Example 24 includes the subject matter of any of Examples 18-23, and wherein determining one or more threat response systems comprises determining a response system located remotely from the computing system.

Example 25 includes the subject matter of any of Examples 18-24, and wherein determining one or more threat response systems comprises determining multiple response systems, wherein each response system of the multiple response systems is from a different architecture level of the computing system.

Example 26 includes the subject matter of any of Examples 18-25, and wherein determining one or more threat response systems comprises determining a response system from a hardware level of the computing system and determining a response system from an application level of the computing system.

Example 27 includes the subject matter of any of Examples 18-26, and wherein determining a temporal sequence of the determined mitigation actions comprises determining, for each mitigation action of each mitigation scenario, a start time for the associated mitigation action.

Example 28 includes the subject matter of any of Examples 18-27, and wherein the start time for each mitigation action is different from the start time of each other mitigation action.

Example 29 includes the subject matter of any of Examples 18-28, and wherein implementing each of the plurality of mitigation scenarios comprises implementing each mitigation action of each mitigation scenario using the associated response system according to the associated temporal sequence.

Example 30 includes the subject matter of any of Examples 18-29, and wherein implementing each of the plurality of mitigation scenarios comprises requesting a threat mitigation user interaction be performed by the user during implementation of at least one of the plurality of mitigation scenarios.

Example 31 includes the subject matter of any of Examples 18-30, and wherein evaluating the threat mitigation result of each mitigation scenario comprises determining an effectiveness of each mitigation scenario in mitigating an impact of the security threat to the computing system.

Example 32 includes the subject matter of any of Examples 18-31, and wherein detecting the existence of a security threat comprises detecting the presence of a malware on the computing system.

Example 33 includes the subject matter of any of Examples 18-32, and wherein determining one or more threat mitigation actions comprises determining a security action implementable by the computing system to respond to the detected security threat.

Example 34 includes the subject matter of any of Examples 18-33, and wherein determining one or more threat mitigation actions comprises determining a data backup action, a data restore action, a data journaling action, a social sharing action, a public shaming action, or a perfect forward secrecy action.

Example 35 includes one or more computer-readable storage media comprising a plurality of instructions stored thereon that, in response to execution, cause a computing device to perform the method of any of Examples 18-34.

Example 36 includes a computing system for managing security threats, the computing device comprising means for performing the method of any of Examples 18-34.

The invention claimed is:

1. A computing system for managing security threats, the computing system comprising:
a processor to execute:
  a threat detection module to detect the existence of a security threat to the computing system;
  a threat mitigation analysis module to determine a plurality of mitigation scenarios to employ to mitigate the security threat and implement each of the plurality of mitigation scenarios on the computing device to mitigate the security threat, wherein each mitigation scenario comprises (i) one or more threat mitigation actions to be performed by the computing system, (ii) one or more threat response systems of the computing system to be used to perform the selected threat mitigation actions, and (iii) a temporal sequence of the determined mitigation actions, wherein the temporal sequence defines an order in which the determined mitigation actions are to be performed; and
  an evaluation module to (i) evaluate a threat mitigation result of each mitigation scenario, (ii) select one of the mitigation scenarios from the plurality of mitigation scenarios to respond to future security threats based on the evaluation of the threat mitigation results, and (iii) store the selected threat mitigation scenario as a validated threat mitigation scenario to use to respond to the security threat; and
  a user habituation module to implement a threat scenario on the computing system to replicate the security threat,
  wherein the threat mitigation analysis module is to receive the validated threat mitigation scenario and implement the validated threat mitigation scenario to mitigate the threat scenario, and
  wherein the user habituation module is further to request, from a user, at least one threat mitigation user interaction with the computing system and reward the user based on the at least one threat mitigation user interaction to habituate the user in responding to the security threat.

2. The computing system of claim 1, wherein the user habituation module is further to:
determine whether the threat scenario has been mitigated by the validated threat mitigation scenario; and
evaluate a performance of the user in mitigating the threat scenario based on the threat mitigation user interaction.

3. The computing system of claim 1, wherein the one or more threat response systems comprise one or more systems of the computing system that is not dedicated to security of the computing system.

4. The computing system of claim 1, wherein to determine one or more threat response systems comprises to determine multiple response systems, wherein each response system of the multiple response systems is from a different architecture level of the computing system.

5. The computing system of claim 1, wherein to implement each of the plurality of mitigation scenarios comprises to implement each mitigation action of each mitigation scenario using the associated response system according to the associated temporal sequence.

6. The computing system of claim 1, wherein to implement each of the plurality of mitigation scenarios comprises to request a threat mitigation user interaction be performed by the user during implementation of at least one of the plurality of mitigation scenarios.

7. One or more non-transitory, computer-readable storage media comprising a plurality of instructions stored thereon that, in response to execution, cause a computing system to:
  detect the existence of a security threat to the computing system;
  determine a plurality of mitigation scenarios to employ to mitigate the security threat, wherein to determine the plurality of mitigation scenarios comprises to determine, for each scenario, (i) one or more threat mitigation actions to be performed by the computing system, (ii) one or more threat response systems of the computing system to be used to perform the selected threat mitigation actions, and (iii) a temporal sequence of the determined mitigation actions, wherein the temporal sequence defines an order in which the determined mitigation actions are to be performed;
  implement each of the plurality of mitigation scenarios to mitigate the security threat;
  evaluate a threat mitigation result of each mitigation scenario;
  select one of the mitigation scenarios from the plurality of mitigation scenarios to respond to future security threats based on the evaluation of the threat mitigation results;
  store the selected threat mitigation scenario as a validated threat mitigation scenario to use to respond to the security threat;
  implement a threat scenario on the computing system to replicate the security threat;
  retrieve the validated threat mitigation scenario;
  implement the validated threat mitigation scenario to mitigate the threat scenario; and
  request, from a user, at least one threat mitigation user interaction with the computing system to habituate the user in responding to the security threat; and
  reward the user based on the at least one threat mitigation user interaction to habituate the user in responding to the security threat.

8. The one or more non-transitory, computer-readable storage media of claim 7, wherein the plurality of instructions further cause the computing system to:
  determine whether the threat scenario has been mitigated by the validated threat mitigation scenario; and
  evaluate a performance of the user in mitigating the threat scenario based on the threat mitigation user interaction.

9. The one or more non-transitory, computer-readable storage media of claim 7, wherein to determine one or more threat response systems comprises to determine one or more systems of the computing system that is not dedicated to security of the computing system.

10. The one or more non-transitory, computer-readable storage media of claim 7, wherein to determine one or more threat response systems comprises to determine multiple response systems, wherein each response system of the multiple response systems is from a different architecture level of the computing system.

11. The one or more non-transitory, computer-readable storage media of claim 7, wherein to implement each of the plurality of mitigation scenarios comprises to implement each mitigation action of each mitigation scenario using the associated response system according to the associated temporal sequence.

12. The one or more non-transitory, computer-readable storage media of claim 7, wherein to implement each of the plurality of mitigation scenarios comprises to request a threat mitigation user interaction be performed by the user during implementation of at least one of the plurality of mitigation scenarios.

13. A method for managing security threats on a computing system, the method comprising:
  detecting, by the computing system, the existence of a security threat to the computing system;
  determining, by the computing system, a plurality of mitigation scenarios to employ to mitigate the security threat, wherein determining the plurality of mitigation scenarios comprises determining, for each scenario, (i) one or more threat mitigation actions to be performed by the computing system, (ii) one or more threat response systems of the computing system to be used to perform the selected threat mitigation actions, and (iii) a temporal sequence of the determined mitigation actions, wherein the temporal sequence defines an order in which the determined mitigation actions are to be performed;
  implementing, by the computing system, each of the plurality of mitigation scenarios to mitigate the security threat;
  evaluating, by the computing system, a threat mitigation result of each mitigation scenario; and
  selecting, by the computing system, one of the mitigation scenarios from the plurality of mitigation scenarios to respond to future security threats based on the evaluation of the threat mitigation results;
  storing the selected threat mitigation scenario as a validated threat mitigation scenario to use to respond to the security threat;
  implementing a threat scenario on the computing system to replicate the security threat;
  retrieving the validated threat mitigation scenario;
  implementing the validated threat mitigation scenario to mitigate the threat scenario; and
  requesting, from a user, at least one threat mitigation user interaction with the computing system to habituate the user in responding to the security threat; and
  rewarding the user based on the at least one threat mitigation user interaction to habituate the user in responding to the security threat.

14. The method of claim 13, further comprising:
  determining, by the computing system, whether the threat scenario has been mitigated by the validated threat mitigation scenario; and
  evaluating, by the computing system, a performance of the user in mitigating the threat scenario based on the threat mitigation user interaction.

15. The method of claim 13, wherein determining one or more threat response systems comprises determining one or more systems of the computing system that is not dedicated to security of the computing system.

16. The method of claim 13, wherein determining one or more threat response systems comprises determining multiple response systems, wherein each response system of the multiple response systems is from a different architecture level of the computing system.

17. The method of claim 13, wherein implementing each of the plurality of mitigation scenarios comprises implementing each mitigation action of each mitigation scenario using the associated response system according to the associated temporal sequence.

18. The method of claim 13, wherein implementing each of the plurality of mitigation scenarios comprises requesting a threat mitigation user interaction be performed by the user during implementation of at least one of the plurality of mitigation scenarios.

* * * * *